UNITED STATES PATENT OFFICE.

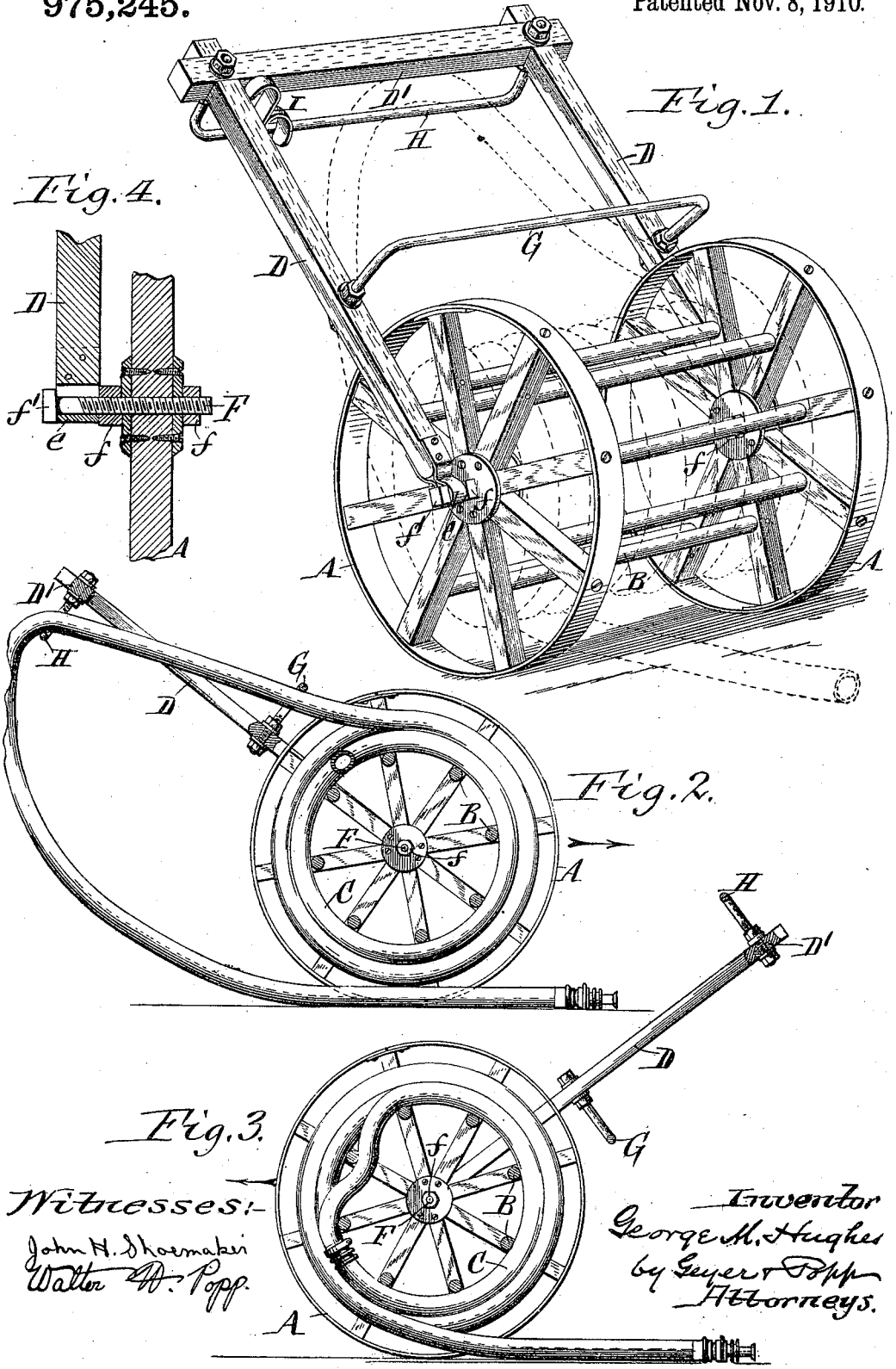

GEORGE M. HUGHES, OF BUFFALO, NEW YORK.

HOSE-REEL.

975,245.   Specification of Letters Patent.   Patented Nov. 8, 1910.

Application filed August 19, 1909. Serial No. 513,609.

*To all whom it may concern:*

Be it known that I, GEORGE M. HUGHES, a citizen of the United States, residing at Buffalo, in the county of Erie and State of New York, have invented a new and useful Improvement in Hose-Reels, of which the following is a specification.

This invention relates to a hose reel designed more especially for lawn or garden hose. Its object is the construction of an inexpensive reel which permits convenient winding up and unwinding of the hose and enables it to be evenly coiled upon the reel.

In the accompanying drawings: Figure 1 is a perspective view of a hose-reel embodying the invention. Fig. 2 is a longitudinal section thereof, showing the position of the handle-frame for winding the hose upon the reel. Fig. 3 is a similar section, showing the handle-frame reversed for unwinding the hose. Fig. 4 is a fragmentary longitudinal section of the handle-frame and one of the wheels, showing its axle.

Similar letters of reference indicate corresponding parts throughout the several views.

In its preferred form, the reel comprises a pair of ground wheels A, A connected by an annular row of rods or rungs B which are suitably secured at their ends to the spokes of the wheels and constitute the drum or reel-body upon which the hose C is wound. The reel proper may, however, be of any other suitable construction.

The handle or handle-frame of the reel preferably consists of a yoke having side bars D, D, and a cross bar $D^1$ rigidly connecting their outer ends. These side bars are provided at their front ends with suitable clips or bearings $e$ in which are journaled short axles or bolts F projecting from the outer sides of the wheels. These bolts are firmly secured in the hubs of the wheels by nuts $f$, and the bearings $e$ are retained thereon by nuts or heads $f^1$ at the outer ends of the bolts. This forms a simple construction which permits the handle-frame to swing vertically on the axles of the reel.

G indicates a cross bar or hold-down bar which bridges the side bars of the handle-frame adjacent to the drum of the reel and under which the hose passes in winding it upon the reel. This cross bar serves to hold the hose in close proximity to the drum especially when the hose is new, causing it to coil closely thereon and preventing undue slack and kinking of the same. For this purpose, the hold-down bar G is raised a suitable distance above the side bars D and is preferably U-shaped, its ends passing through holes in said bars in which they are rigidly secured by nuts or other suitable fastenings, as shown.

H indicates a guide-bar or support arranged on the underside of the handle-frame in rear of the hold-down bar G and extending practically throughout the length of the reel. This guide bar is preferably arranged in line with the cross bar $D^1$ of the handle-frame and located a sufficient distance therefrom to admit the hose between these bars. As shown in the drawings, the guide bar is preferably U-shaped and its ends pass through the intersecting portions of the side bars D and cross bar $D^1$ to which they are rigidly secured by screw nuts, whereby the guide bar performs the additional function of securely tying the members of the handle-frame together. This bar serves as a guide or support on which the hose can be conveniently shifted laterally in either direction, in order to wind its successive coils evenly, side by side.

In winding the hose on the reel, its rear portion is passed over the guide bar H and under the hold-down bar G, and the portion next to the coupling is then passed over and under adjacent rungs of the reel to hold said end from displacement. The truck of the reel is then trundled over the lawn or garden toward the nozzle end of the hose, with the wheels on opposite sides of the hose, whereby the latter is wound upon the reel, its coils being uniformly laid side by side by shifting the hose on the guide-bar H, as above described. The nozzle end of the hose may be engaged with a clip or clasp I or other suitable holding device.

To unwind the hose, its nozzle end is released from the clasp I after which the handle-frame is reversed to the position shown in Fig. 3 and the reel pushed forwardly over the lawn away from said nozzle-end, as indicated by the arrow in said figure.

While I prefer to use the hold-down bar G, it is not indispensable and may be omitted, if desired.

I claim as my invention:

1. A hose reel comprising a wheeled reel-body, a handle-frame attached thereto and having side-bars pivoted at their front ends to the reel-body, and a guide-bar for the hose carried by the rear portion of said handle-frame and extending from one of its side bars to the other, said guide bar being depressed below the plane of said bars.

2. A hose reel comprising a wheeled reel-body, a handle-frame attached thereto and having side-bars pivoted at their front ends to the reel-body, a cross-bar connecting the rear portions of said side-bars, and a guide-bar arranged transversely on the underside of said cross-bar and separated therefrom by an intervening space for the passage of the hose.

3. A hose reel comprising ground-wheels, rungs connecting said wheels and forming the reel-body, a handle-frame having side-bars arranged on the outer sides of said wheels and pivoted to the axle thereof, a cross-bar connecting the rear ends of said side-bars, and a guide-bar for the hose arranged transversely on the underside of said cross-bar and spaced therefrom.

4. A hose-reel, comprising a wheeled reel-body, a handle-frame attached thereto and having side bars pivoted at their front ends to said reel-body, a cross bar intersecting the rear ends of said side bars and a U-shaped guide bar for the hose arranged transversely on the underside of said frame, the ends of the guide-bar passing through the intersecting portions of said side and connecting bars.

5. A hose-reel, comprising a wheeled reel-body, a handle-frame attached thereto, a hold down bar extending across the upper side of said frame near the reel-body, and a guide bar extending across the lower side of said frame near its outer free end.

6. A hose-reel, comprising a wheeled reel-body, a handle-frame reversibly attached thereto, a U-shaped hold-down bar extending across the upper side of said frame, and a U-shaped guide bar extending across the lower side of said frame near its outer end.

Witness my hand this 16th day of August, 1909.

GEORGE M. HUGHES.

Witnesses:
C. F. GEYER,
E. M. GRAHAM.